United States Patent [19]

Wexell

[11] 4,158,080

[45] Jun. 12, 1979

[54] GLASS ENAMEL FLUXES

[75] Inventor: Dale R. Wexell, Corning, N.Y.

[73] Assignee: Corning Glass Works, Corning, N.Y.

[21] Appl. No.: 949,445

[22] Filed: Oct. 10, 1978

[51] Int. Cl.² .................. B32B 7/02; B32B 17/06; C03C 5/02

[52] U.S. Cl. ..................................... 428/212; 106/49; 106/53; 428/427; 428/428

[58] Field of Search .................... 106/49, 53; 428/212, 428/427, 428

[56] References Cited

U.S. PATENT DOCUMENTS 4,038,448  7/1977  Boyd et al. ............................. 106/49

*Primary Examiner*—O. R. Vertiz
*Assistant Examiner*—Mark Bell

*Attorney, Agent, or Firm*—Clinton S. Janes, Jr.

[57] ABSTRACT

The invention disclosed is a family of enamel fluxes that forms the basis for enamels used in decorating opal glasses where the glasses have softening points in excess of 760° C. and coefficients of thermal expansion (25°–300° C.) of $70-85 \times 10^{-7}/°$ C. The enamel fluxes have softening points in the range of 550°–575° C., toxic metal release values below FDA prescribed standards, coefficients of thermal expansion in the range of $65-75 \times 10^{-7}/°$ C. and preferably at least 5 units below the coefficient of the opal glass, and fire to a high gloss in a firing cycle of less than 10 minutes having a maximum temperature below 720° C. They have compositions that form a family in the $Li_2O$-$Na_2O$-$B_2O_3$-$TiO_2$-$CdO$-$ZrO_2$-$PbO$-$SiO_2$ system.

8 Claims, No Drawings

GLASS ENAMEL FLUXES

BACKGROUND OF THE INVENTION

Opal glasses are produced by forming, or maintaining, in a glass a second phase that has a sufficiently different refractive index from that of the glass to effectively scatter transmitted light and thereby create an opaque appearance. In the absence of glass colorants or pigments, an opal glass generally appears white, and the density of the opal depends, among other things, on the relative difference in refractive indices and the amount of opal phase present in the glass.

Opal glasses are widely used in both culinary and tableware. The mechanical strength of such ware may be enhanced by thermal tempering, thus permitting a thinner wall, and hence lighter weight, in the ware. As wall thickness of an article is decreased, however, the need for a high opal density becomes more critical in order to avoid a translucent effect in the thin wall.

It is of course possible to use opal glassware as molded, that is, in the plain white state with no decorative coating applied. However, most homemakers demand a decorative appearance on their cookware and tableware, and a wide variety of colors and colored patterns has been developed to satisfy this need.

Decorative enamels have been employed extensively in the past to impart color and/or gloss to opal glass articles. Such enamels customarily are composed of a clear glass base, referred to as the flux, and a mill-type addition, referred to as the pigment, the latter supplying the coloring effect in the enamel. The enamel, consisting of intimately mixed flux and pigment, is applied to the surface of the glass in frit form and fired to form an adherent, continuous coating on the glass.

The firing temperature must be sufficiently high to permit the enamel flux to completely dissolve and/or suspend the pigment in a smooth homogeneous coating, while not becoming so soft as to separate or flow away from the pigment. However, the firing temperature of the enamel must not be so high as to cause thermal deformation of the opal glass substrate. Typically, flat tableware, such as dinner plates and saucers, must be fired at lower temperatures, than items such as cups, casseroles, or serving bowls. Hence, lower firing temperatures, and consequently lower softening point enamel fluxes, are required to prevent sagging of these flat tableware bodies. Also, the enamel will normally have a coefficient of thermal expansion somewhat below that of the opal glass in order to inhibit crazing or spalling and to place the enamel coating in compression with respect to the glass after the firing step.

It has become customary to include substantial amounts of lead oxide and also, in some cases, cadmium oxide in an enamel flux composition to provide a high index of refraction and low melting point. Also, cadmium compounds are frequently used as yellow and red enamel pigments, and, therefore, CdO must be present in the enamel flux to allow sufficient dissolution of the cadmium-bearing pigment in order to develop the desired color. It is well known, however, that lead and cadmium are extremely toxic metals, and that enamels containing these metals must be highly resistant to chemical attack by such varied chemicals as acids, alkalis, and sulfides in order to prevent appreciable release of these toxic metal elements.

In recognition of the potential danger from excessive toxic metal release, the Food and Drug Administration (FDA), in its Compliance Guidance Manual issued June 13, 1974, has established maximum limits which lead and/or cadmium release from an enameled surface must not exceed. In the prescribed FDA test, an enamelled surface is exposed for 24 hours to 4% acetic acid at room temperature ($22 \pm 2°$ C.). A sample of the acid solution is then tested for absorbance in an atomic absorption spectroscope and the observed value converted to a metal concentration value on a standard curve, the metal being reported in parts per million (ppm). The reported value is based on the inside volume of a hollow article having an enamelled or decorated inner surface and filled to a specified level with acetic acid for the test. A similar test has been devised for use on exterior surfaces of a vessel or dish as well.

In order to comply with FDA requirements, lead release from a food contacting surface, that is, the inside of a dish which actually contacts food during preparation, service or storage, must not exceed 7.0 parts per million (ppm) and cadmium release correspondingly must not exceed 0.5 ppm. It is of course desirable to employ enamels having release values well below these limits at any time during the expected life of an enamelled article. To this end, arbitrary lifetime standards of less than 1.3 ppm lead and less than 0.3 ppm cadmium have been established by the applicant.

While the FDA standards are based on acid reaction on a freshly produced article, it is well known that alkaline solutions may be even more detrimental to a vitreous surface. Accordingly, a test has been devised in which weighed and measured samples of enameled glass are immersed in a 0.3% by weight aqueous solution of an alkaline detergent marketed by Economics Laboratories, St. Paul, Minn., under the mark Super Soilax. The solution is maintained at 95° C. for 24 hours, after which the samples are removed, rinsed, dried, and weight loss determined. The loss may be based on the enamel, per se, or may be reported as lead and/or cadmium release values for comparison with FDA standards. The time of 24 hours represents an accelerated equivalent to the anticipated exposure of a dish to such conditions during its expected lifetime.

It has been observed above that an enamel is applied as a milled mixture of a flux or vitreous portion and a pigment additive. The pigment is normally a minor part of the enamel, added in amounts less than 20%, and frequently less than 10%, to impart opacity and/or color to the enamel. The physical properties and sealing characteristics of an enamel are determined primarily by the flux or vitreous base component, and therefore it is this material upon which research is primarily concentrated for improvement and/or modification of characteristics other than color. However, metal release is measured on the fired enamel, that is, the flux plus pigment.

PRIOR ART

U.S. Pat. No. 4,038,448, granted July 26, 1977 in the name of Boyd et al., discloses dense opal glasses having softening points over 760° C., coefficients of thermal expansion in the range of $66-75 \times 10^{-7}/°$C., and compositions in the $Na_2O-Al_2O_3-SiO_2-F$ system. It further discloses enamels for use in decorating such glasses wherein the flux composition of the enamel is essentially free from alkali metal oxides other than lithia and is in the $Li_2O-B_2O_3-TiO_2-ZrO_2-PbO-SiO_2$ system. These enamels are characterized by low lead and cadmium release values when exposed to chemical attack, and have coefficients of expansion in the range of 57-70×10$^{-7}$/°C.

The foregoing patent sets forth an extensive review of potentially relevant prior enamel art, and such review is incorporated herein by reference to avoid repetition.

PURPOSE OF THE INVENTION

An enamel flux, selected from the above-mentioned Boyd et al. patent compositions and found to have particularly good durability and metal release characteristics when properly fired, has this composition in weight percent on an oxide basis: 50.2% PbO, 33.2% SiO$_2$, 5.2% B$_2$O$_3$, 1.1% Li$_2$O, 2.1% TiO$_2$, 6.9% ZrO$_2$ and 1.2% CdO. However, this flux has a coefficient of thermal expansion of 58.5×10$^{-7}$/°C. and a softening temperature of 605° C., whereas a lower softening temperature of 550°-575° C. was required for use on a commercial opal glass having a nominal coefficient of thermal expansion of 80×10$^{-7}$/°C. and softening point of 775° C.

The obvious expedient for decreasing the softening temperature of the Boyd et al. enamel flux was an increase in lithia content, but this change tended to cause phase separation in the enamel flux, thereby producing opacity and poor durability to chemical attack. It was of course well known that addition of the other common alkali metal oxides, soda and/or potash, would soften the flux also, but the patent specifically teaches that these oxides should be avoided to minimize lead and/or cadmium release and to retain a low coefficient of expansion.

It is the purpose of the present invention to provide enamel fluxes having chemical and physical characteristics equivalent, or superior, to those disclosed in the Boyd et al. patent, but having softening temperatures in the 550°-575° C. range which will adapt them to use on substrate opal glasses such as the commercial glass mentioned above.

SUMMARY OF THE INVENTION

The flux component in the present enamels has a softening point of 550°-575° C., whereby the enamel fires to a high gloss in a firing cycle of less than 10 minutes with a maximum temperature of less than 720° C., lifetime lead and/or cadmium release values below FDA standards, and a coefficient of thermal expansion in the range of 65-75×10$^{-7}$/°C. and at least 5 units below the corresponding opal glass value. Further, these enamel fluxes are composed essentially, in weight percent on an oxide basis, of 28-35% SiO$_2$, 45-55% PbO, 5-8% ZrO$_2$, 4-6% B$_2$O$_3$, 1-3% TiO$_2$, 1-2% Li$_2$O, and 0.5-2.0% M$_2$O(Na$_2$O+K$_2$O), the total Li$_2$O plus M$_2$O being not over 3%. In order to minimize cadmium release, when this metal is present in the enamel pigment, the Li$_2$O and M$_2$O contents, respectively, should not exceed 1.5% and 1.0%.

GENERAL DESCRIPTION OF THE INVENTION

The enamels of the present invention have been specifically devised for use on a commercial opal glass closely approximating in composition that disclosed by G. A. Macbeth in U.S. Pat. No. 1,214,202 granted Jan. 30, 1917. This glass has a softening point of 775° C., a coefficient of thermal expansion of 80×10$^{-7}$/°C., and the following approximate composition in parts by weight:

SiO$_2$—59.8
Al$_2$O$_3$—10.3
CaO—4.8
Na$_2$O—8.5
K$_2$O—2.1
ZnO—10.1
B$_2$O$_3$—1.4
F—3.0

While particularly designed for this glass, the present enamels are in no way limited thereto. For example, they are also useful with many other opal glasses including those disclosed in Ser. No. 784,156 filed Apr. 4, 1977 by D. C. Boyd et al. and entitled "Spontaneous Opal Glasses". These glasses have a softening point above 755° C., a coefficient of thermal expansion in excess of 65×10$^{-7}$/°C., and compositions within the Na$_2$O-SrO-Al$_2$O$_3$-SiO$_2$-F field.

Traditionally, enamel fluxes have had a large content of lead oxide (PbO) to provide a low softening point and other properties consistent with a smooth, craze-free, uniform enamel coating on a glass surface. In the glass decorating process, one or more milled enamels are applied over a selected portion of a glass surface either through the medium of an organic vehicle or as a preformed decal pattern or the like. In any case, the softening point of the enamel flux must be well below that of the glass substrate to permit adequate softening and flow of the enamel without deformation of the glass substrate. This normally entails a firing cycle which is less than 10 minutes in length and wherein the maximum temperature is not over 150° above the softening point of the enamel flux.

Lead oxide, and to a lesser extent cadmium oxide (CdO), also impart a high gloss or brilliancy to the fired enamel as a result of their high indices of refraction. However, the content of these oxides must be limited in order to avoid loss of resistance to chemical attack, and possible metal release, in the fired enamel.

Other oxides commonly used to decrease the softening point of an enamel flux include the alkali metal oxides, particularly soda (Na$_2$O), and boric oxide (B$_2$O$_3$). It has been reported, however, that these oxides also must be limited in order to avoid encountering chemical durability, and consequent metal release, problems. In particular, the Boyd et al. U.S. Pat. No. 4,038,448 describes in detail the manner in which leaching of soda and/or potash from an enamel flux leads to metal release, and specifically excludes these oxides in favor of lithia (Li$_2$O) as the alkali metal constituent of the enamel fluxes in that patent.

The present invention is based on my dual discovery that (1) the Li$_2$O content of my enamel fluxes must be limited to avoid phase separation and opalization of the enamel flux, and (2) soda and/or potash can be present, albeit in very limited amounts, to lower the softening temperatures while still maintaining good chemical durability and very low levels of metal release. In addition to the dual use of lithia and a second alkali metal oxide (M$_2$O) in small, closely controlled amounts, there are several other essential ingredients which also must be maintained within rather narrow limits. The several essential ingredients of the present enamel fluxes, their function, and the need for limitation or control, are now set forth:

The enamel flux must contain at least 1% Li$_2$O to provide the desired low softening point. However, large amounts tend to promote phase separation and also cause a decrease in detergent durability and an increase in potential metal release. Hence, the Li$_2$O content must not exceed 2%, and preferably is below 1.5%.

A characteristic feature of the invention is the presence of at least 0.5% of $M_2O$ to supplement the lithia. This oxide, however, raises the expansion coefficient sharply and may have a disastrous effect on durability. Hence, it must not exceed 2% and preferably is below 1%.

The flux will contain at least 4% $B_2O_3$ because of the beneficial effect of this oxide on softening point while creating but little change in expansion coefficient. However, a content greater than about 6%, like a large lithia content, tends to cause phase separation in the flux as well as a decrease in detergent durability.

Lead oxide performs its usual function of providing a low softening point and a high gloss or brilliancy in the enamel. Cadmium oxide (CdO), while not essential, may be present in amounts up to about 4% to supplement the high brilliancy imparted by the lead oxide. As noted earlier, at least 1% must be present if a cadmium bearing pigment is to be used for coloration. Lead oxide content greater than about 55% tends to decrease the chemical durability of the enamel and increase the potential for metal release.

Titania ($TiO_2$) and zirconia ($ZrO_2$) are included to impart excellent resistance to alkali attack and to provide the desired very low release rates for lead and cadmium. Inclusion of these oxides in the glass structure is believed to densify the structure and substantially reduce the number of unbonded oxygen atoms, thereby inhibiting the diffusion of chemical agents into the glass structure.

It has previously been pointed out that pigment materials are customarily included in decorative enamels to provide color and/or opacity. Inasmuch as the present invention is concerned with the flux component of the enamel, rather than the pigment, no further mention is made of the pigment, except to say that any of the known pigments may be employed in the usual manner and amount to produce the customary effects in the present enamels.

SPECIFIC EMBODIMENTS

Table IA records enamel flux compositions, expressed in parts by weight on the oxide basis, illustrating the instant invention. Because the sum of the individual components totals approximately 100, the tabulated values can reasonably be considered to be reported in terms of weight percent. The same compositions are shown in mole percent in Table IB since composition changes, particularly in the alkalies, are more apparent on this basis.

TABLE IA

|  | 1 | 2 | 3 | 4 | 5 | 6 | 7 |
|---|---|---|---|---|---|---|---|
| PbO | 50.2 | 50.2 | 50.5 | 50.3 | 50.0 | 49.7 | 51.4 |
| $SiO_2$ | 33.2 | 31.9 | 32.1 | 32.0 | 31.8 | 31.6 | 30.7 |
| $B_2O_3$ | 5.2 | 5.0 | 5.0 | 5.0 | 4.8 | 5.0 | 4.9 |
| $Li_2O$ | 1.1 | 1.3 | 1.9 | 1.6 | 0.9 | 1.5 | 1.3 |
| $Na_2O$ | — | 1.2 | — | 0.6 | 1.9 | 1.1 | 0.7 |
| $TiO_2$ | 2.1 | 1.8 | 1.9 | 1.8 | 1.8 | 2.0 | 1.9 |
| $ZrO_2$ | 6.9 | 6.5 | 6.5 | 6.5 | 6.5 | 6.9 | 6.8 |
| CdO | 1.2 | 2.2 | 2.2 | 2.2 | 2.1 | 2.2 | 2.2 |

TABLE IB

|  | 1 | 2 | 3 | 4 | 5 | 6 | 7 |
|---|---|---|---|---|---|---|---|
| PbO | 23.0 | 22.9 | 22.9 | 22.9 | 22.9 | 22.5 | 24.2 |
| $SiO_2$ | 56.4 | 54.0 | 54.0 | 54.1 | 52.9 | 53.3 | 52.6 |
| $B_2O_3$ | 7.6 | 7.3 | 7.3 | 7.3 | 7.1 | 7.3 | 7.4 |
| $Li_2O$ | 3.8 | 4.4 | 6.4 | 5.4 | 3.2 | 5.2 | 4.5 |
| $Na_2O$ | — | 1.9 | — | 1.0 | 3.2 | 1.9 | 1.2 |
| $TiO_2$ | 2.6 | 2.3 | 2.3 | 2.3 | 2.4 | 2.5 | 2.4 |
| $ZrO_2$ | 5.7 | 5.4 | 5.4 | 5.4 | 5.4 | 5.6 | 5.8 |
| CdO | 0.9 | 1.7 | 1.7 | 1.7 | 1.7 | 1.7 | 1.8 |

In producing batches for melting the present fluxes, and more specifically those illustrated in Table I, suitable ingredients, either as the indicated oxides or as compounds convertible thereto on melting, are mixed in the indicated proportions to form a batch which may then be ballmilled to assist in achieving homogeneous melt. Ammonium nitrate is generally included in the 2-3% weight range to ensure an oxidizing environment in the Pt crucibles. Each batch is then deposited in a suitable melting unit and melted at temperatures in the range of 1300°-1400° C.

Batches corresponding to the formulae in Table I were melted in platinum crucibles fired for 2-3 hours in an electric furnace operating within the indicated temperature range. Each molten batch was then poured into water to produce a granulated enamel flux that was subsequently crushed to pass through a No. 400 U.S. Standard Sieve (37 microns). Prior to pouring the melt a sample was drawn in the form of cane having a diameter of about 0.25 in. in diameter, such cane being for use in measuring the thermal expansion coefficient of the flux material.

Each of the enamel fluxes thus produced was compounded with a commercial ceramic pigment in a ratio of 92 parts flux to 8 parts pigment. The ceramic pigment contained 40% of a cadmium compound, and produced a yellow enamel known as Tiberon Yellow when combined with an enamel flux. The enamels thus prepared were applied to glassware produced from the commercial glass mentioned earlier. The enameled glassware was fired on a seven minute cycle having a maximum temperature of about 715° C.

The fired glassware was divided into two identical sets for test purposes. One set was subjected to the FDA-prescribed, acetic acid test described earlier and lead and cadmium release values determined in parts per million (ppm). The second set was subjected to the alkaline detergent (Super Soilax) test, also described earlier. In this test, exposure time was 96 hours, this being accepted as the accelerated equivalent of an average lifetime service of ten years. Again lead and cadmium release determinations were made and reported in parts per million.

The data determined from the several tests and property measurements are recorded in Table II. Thus, the softening point (S.P.) is shown in degrees Centigrade, while coefficient of thermal expansion (Exp.) is shown in units which are mutliplied by $10^{-7}/°C$. for actual values. Also, the lead and cadmium release values, in parts per million (ppm) are shown as measured in the FDA test and in the alkaline detergent (AD) test. For comparative evaluation, the FDA prescribed limits for food contacting surfaces are 7.0 ppm lead and 0.5 ppm cadmium.

TABLE II

| Example | S.P. (°C.) | Exp. (× $10^{-7}$/°C.) | Metal Release (ppm) FDA Pb | FDA Cd | AD Pb | AD Cd |
|---|---|---|---|---|---|---|
| 1 | 605 | 58.5 | — | — | — | — |
| 2 | 559 | 71.0 | 0.96 | 0.08 | 1.51 | 1.28 |
| 3 | 562 | 66.7 | 0.80 | 0.08 | 1.11 | 0.97 |
| 4 | 562 | 68.4 | 0.84 | 0.08 | 1.17 | 0.92 |
| 5 | 565 | 72.3 | 1.05 | 0.20 | 1.20 | 1.19 |
| 6 | 567 | 70.0 | 1.21 | 0.21 | 0.59 | 0.56 |
| 7 | 568 | 66.9 | 0.41 | 0.05 | 0.24 | 0.25 |

Composition 1 illustrates an enamel flux composition of the previously mentioned Boyd et al. application which, characteristically, is free of $Na_2O$ and $K_2O$. However, the softening point of this flux was considered to be at least 30° C. too high for present purposes.

The remaining compositions, numbers 2 through 7, generally illustrate the invention, but only one, number 7, represents the optimum or preferred embodiment. Thus, Table II shows that each of examples 2 through 7 has a softening point in the range of 550°–575° C., and an expansion well below $80 \times 10^{-7}$/°C. Also, the lead release values are generally satisfactory. However, cadmium values, while meeting the FDA acid test standards, tend to increase substantially in lifetime testing under alkaline conditions. In practice, of course, considerably lower values are usually encountered, particularly with decorations, because only a fraction of a dish surface is covered.

The property trends indicated by the various compositions become somewhat more evident from a comparison of changes in mole composition, as in Table IB, rather than weight composition. This is particularly true for the light weight oxides such as $Li_2O$, $B_2O_3$ and $Na_2O$.

Example 3 illustrates an attempt to achieve the purposes of the invention in accordance with the earlier patent teaching, that is by relying on lithia alone as a flux. While physical properties can be attained, cadmium release after service is above limits. More important, however, the flux tends to opalize when fired, thus altering the enamel color and making it unusable even with a non-cadmium pigment.

Example 2, particularly when compared with Example 7, shows the rather sharp changes effected by a relatively small increase in soda content. This higher soda content makes the flux more susceptible to hydrolytic attack in a basic solution.

Another general trend observed is the deleterious effect on durability when even a small decrease in zirconia is made. Accordingly, an amount in excess of 5.5 mole percent, and, correspondingly, over 6.5 weight percent, is preferred.

Example 6 illustrates that quite good metal release values can be attained even with relatively high alkali content, provided the zirconia level is also maintained reasonably high. However, the flux of Example 6 has an adverse effect on color development when fired, thus making it less desirable from this standpoint.

Composition 7 represents the optimum combination of enamel flux properties for present purposes and illustrates the following preferred composition ranges in weight percent: 50–55% PbO, 28–32% $SiO_2$, 6.5–8% $ZrO_2$, 4–6% $B_2O_3$, 1–3% $TiO_2$, 1.0–1.5% $Li_2O$ and 0.5–1.0% $Na_2O$.

It will be appreciated that the effectiveness of any enamel flux depends on its ability to take up the pigment by solution or suspension. This in turn depends on proper firing and more particularly the maximum temperature in the cycle. Thus an underfired enamel may not fully take up the pigment and leave it more readily available for release into the acetic acid. Likewise, overfiring can cause the flux to become too fluid and flow away from the pigment, again leaving it more susceptible to attack.

I claim:

1. In a composite article consisting of an opal glass body and an adherent, high gloss, enamel, wherein
    the opal glass has a softening point in excess of 760° C., a strain point in excess of 490° C. and a coefficient of thermal expansion (0°–300° C.) of $70-85 \times 10^{-7}$/°C.,
    an enamel that has a 96 hour lead release below the FDA standard, a coefficient of expansion of $65-75 \times 10^{-7}$/°C. that is at least 5 units below the glass value, that fires to a high gloss in less than 10 minutes in a firing cycle having a maximum temperature less than 720° C., and wherein the enamel flux has a softening point of 550°–575° C., and is chemically composed essentially, in weight percent as calculated on the oxide basis, of 28–35% $SiO_2$, 45–55% PbO, 5–8% $ZrO_2$, 4–6% $B_2O_3$, 1–3% $TiO_2$, 1–2% $Li_2O$, and 0.5–2.0% $M_2O$ ($Na_2O + K_2O$), the total $Li_2O$ plus $M_2O$ being not over 3%.

2. A composite article in accordance with claim 1 wherein the enamel flux has a $Li_2O$ content not over 1.5% and a $Na_2O$ content not over 1.0%.

3. A composite article in accordance with claim 1 wherein the enamel flux additionally contains 1–4% CdO.

4. A composite article in accordance with claim 1 wherein the enamel flux is chemically composed essentially of, in weight percent as calculated on an oxide basis, 50–55% PbO, 28–32% $SiO_2$, 6.5–8% $ZrO_2$, 4–6% $B_2O_3$, 1–3% $TiO_2$, 1.0–1.5% $Li_2O$, and 0.5–1.0% $Na_2O$.

5. An enamel having a 96 hour lead release below FDA standards, a coefficient of expansion of $65-75 \times 10^{-7}$/°C. that is at least 5 units below the glass value, that fires to a high gloss in less than 10 minutes in a firing cycle having a maximum temperature of 715° C., and wherein the enamel flux has a softening point of 550°–575° C., and is chemically composed essentially, in weight percent on the oxide basis, of 28–35% $SiO_2$, 45–55% PbO, 5–8% $ZrO_2$, 4–6% $B_2O_3$, 1–3% $TiO_2$, 1–2% $Li_2O$, and 0.5–2.0% $M_2O$, the total $Li_2O$ plus $M_2O$ being not over 3%.

6. An enamel in accordance with claim 2 wherein the flux has a $Li_2O$ content that does not exceed 1.5% and a $Na_2O$ content that does not exceed 1.0%.

7. An enamel in accordance with claim 2 wherein the flux contains 1–4% CdO.

8. An enamel in accordance with claim 2 wherein the flux is chemically composed essentially, in weight percent on the oxide basis, of 50–55% PbO, 28–32% $SiO_2$, 6.5–8% $ZrO_2$, 4–6% $B_2O_3$, 1–3% $TiO_2$, 1.0–1.5% $Li_2O$ and 0.5–1.0% $Na_2O$.

* * * * *

UNITED STATES PATENT AND TRADEMARK OFFICE
CERTIFICATE OF CORRECTION

PATENT NO. : 4,158,080
DATED : June 12, 1979
INVENTOR(S) : Dale R. Wexell

It is certified that error appears in the above-identified patent and that said Letters Patent are hereby corrected as shown below:

Column 3, line 51, change "Sio$_2$" to -- SiO$_2$ --.

Column 6, line 61, change "mutliplied" to -- multiplied --.

Column 8, line 55, change "2" to -- 5 --.

Column 8, line 58, change "2" to -- 5 --.

Column 8, line 60, change "2" to -- 5 --.

Signed and Sealed this

Twenty-third Day of October 1979

[SEAL]

Attest:

RUTH C. MASON
Attesting Officer

LUTRELLE F. PARKER
Acting Commissioner of Patents and Trademarks